(12) United States Patent
Jensen (10) Patent No.: US 6,647,083 B1
(45) Date of Patent: Nov. 11, 2003

(54) METHOD AND APPARATUS FOR STIFFENING A RISER BRACE IN NUCLEAR REACTOR

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/224,429

(22) Filed: Aug. 21, 2002

(51) Int. Cl.[7] ................................................. G21C 9/00
(52) U.S. Cl. ........................ 376/286; 376/372; 376/285; 254/104
(58) Field of Search ................................ 376/260, 287, 376/285, 372, 392, 407, 461, 286; 254/104

(56) References Cited

U.S. PATENT DOCUMENTS

| | | | | |
|---|---|---|---|---|
| 401,368 A | * | 4/1889 | Piper | 254/104 |
| 1,006,974 A | * | 10/1911 | Moore et al. | 254/104 |
| 1,435,811 A | * | 11/1922 | Cuntala | 403/358 |
| 2,547,789 A | * | 4/1951 | Skeel | 403/370 |
| 3,021,112 A | * | 2/1962 | Forman | 254/100 |
| 3,390,862 A | * | 7/1968 | Schreffer | 254/104 |
| 4,142,646 A | * | 3/1979 | Wienpahl | 220/534 |
| 4,184,665 A | * | 1/1980 | Queen, Jr. | 254/104 |
| 4,747,996 A | * | 5/1988 | Hale et al. | 376/261 |
| H906 H | * | 4/1991 | Baggett et al. | 403/409.1 |
| 5,427,349 A | * | 6/1995 | Obrecht | 248/657 |
| 6,099,199 A | * | 8/2000 | Mullenberg | 403/370 |
| 6,463,114 B1 | * | 10/2002 | Wivagg | 376/285 |

FOREIGN PATENT DOCUMENTS

| | | | |
|---|---|---|---|
| GB | 1551408 | * | 8/1979 |
| GB | 2126190 A | * | 3/1984 |
| JP | 6-46885 | * | 4/1993 |

* cited by examiner

Primary Examiner—Michael J. Carone
Assistant Examiner—R Palabrica
(74) Attorney, Agent, or Firm—Harness, Dickey & Pierce, P.L.C.

(57) ABSTRACT

A vibration mitigation clamp apparatus is provided, which is designed to stiffen a riser brace assembly in a nuclear reactor so as to increase the natural vibration frequency of the riser brace assembly. In an embodiment, the vibration mitigation clamp apparatus may include a first plate, a second plate and a wedge assembly. The vibration mitigation clamp apparatus is attached to upper and lower riser brace leaves of the riser brace assembly, at a location near a weld that attaches the leaves to a riser brace block of the riser brace assembly that is affixed to an RPV sidewall. The wedge assembly is expandable to apply forces on inside surfaces of the riser brace leaves, countering clamping forces applied to the first and second plate to fixedly secure the vibration mitigation clamp apparatus on the riser brace assembly.

15 Claims, 6 Drawing Sheets

FIG. 6

METHOD AND APPARATUS FOR STIFFENING A RISER BRACE IN NUCLEAR REACTOR

BACKGROUND OF THE INVENTION

1. Field of the Invention

This invention relates generally to nuclear reactors and, more particularly, to a method and apparatus for stiffening a riser brace that lends lateral support to a jet pump assembly of a boiling water reactor.

2. Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically-shaped shroud.

Figure 1:
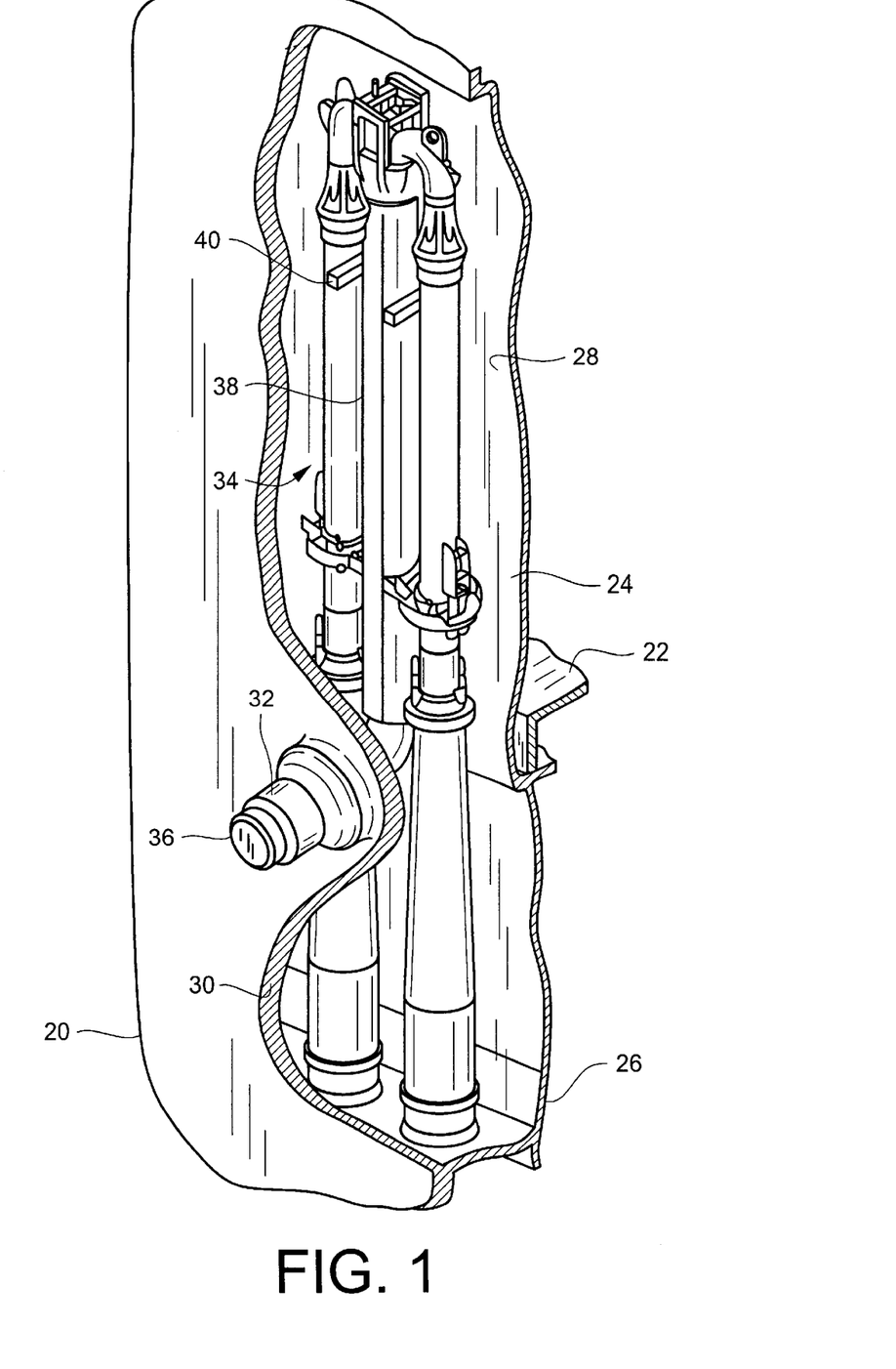
FIG. 1 is a schematic, partial cross-sectional view, with parts cut away, of a reactor pressure vessel of a boiling water nuclear reactor.

FIG. 1 is a schematic, partial cross sectional view, with parts cut away, of a reactor pressure vessel (RPV) 20 for a boiling water reactor. RPV 20 has a generally cylindrical-shape and is closed at one end by a bottom head and at its other end by removable top head (not shown). A top guide (not shown) is situated above a core plate 22 within RPV 20. A shroud 24 surrounds core plate 22 and is supported by a shroud support structure 26. A downcomer annulus 28 is formed between shroud 24 and sidewall 30 of RPV 20.

An annulet nozzle 32 extends through sidewall 30 of RPV 20 and is coupled to a jet pump assembly 34. Jet pump assembly 34 may include a thermal sleeve 36 which extends through nozzle 32, a lower elbow (only partially visible in FIG. 1), and a riser pipe 38. Thermal sleeve 36 is secured at a first end (not shown) to a second end of the lower elbow. The first end of thermal sleeve 36 is welded to the second end of the lower elbow. A first end of the lower elbow similarly secured, or welded, to one end of riser pipe 38. Riser pipe 38 extends between and substantially parallel to shroud 24 and sidewall 30. A riser brace assembly 40 stabilizes riser pipe 38 within RPV 20. The riser brace assembly 40 may be fabricated of type 304 stainless steel which, after periods of use, is susceptible to cracking at welded joints. The riser brace assembly 40 is connected between riser pipe 38 and sidewall 30.

Figure 2:
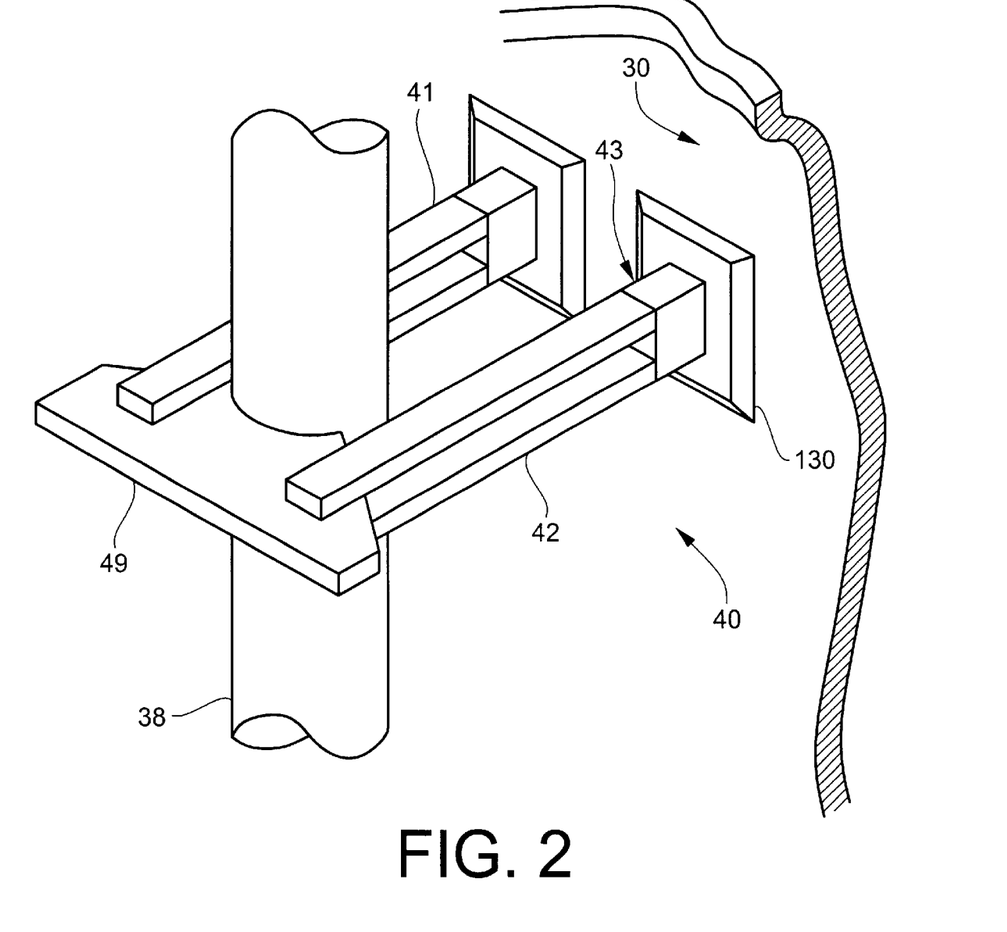
FIG. 2 is a detailed view of a riser brace assembly in accordance with the invention.

FIG. 2 illustrates the riser brace assembly 40 of FIG. 1 in further detail. Riser brace assembly 40 primarily provides lateral support to the jet pump assembly 34 via riser pipe 38, and includes a riser brace block 43 and two riser brace leaves, an upper riser brace leaf 41 and a lower riser brace leaf 42. Leaves 41 and 42 are attached to riser brace block 43 by welds, and riser brace block 43 is welded to a support pad 130 which in turn is affixed to RPV sidewall 30. At the other end, leaves 41 and 42 of the riser brace assembly 40 are connected to a yoke such as brace plate 49. Brace plate 49 in turn is welded to the riser pipe 38.

The riser brace assembly 40 is designed to accommodate the differential thermal expansion that results from reactor start-up and heat-up, and to accommodate the flow-induced vibration that is incumbent in the reactor water recirculation system (not shown) due to reactor recirculation pumps. Accordingly, a concern with the riser brace assembly 40 is that the natural frequency of the riser brace assembly 40 be greater than the vane passing frequency of the recirculation pumps at any pump speed. If the vane passing frequency of the recirculation pumps equals or exceeds the natural frequency of the riser brace assembly 40, the riser brace assembly 40 goes into resonance. The resonating riser brace assembly 40 could potentially cause the riser pipe 38 to become unstabilized, adversely affecting the jet pump assembly 34.

SUMMARY OF THE INVENTION

The present invention provides a method and clamp apparatus for stiffening a riser brace assembly so as increase the natural vibration frequency (e.g., first harmonic natural frequency) of the riser brace assembly above the vane passing frequency of a recirculation pump frequency at any pump speed, Installation of the vibration mitigation clamp apparatus should not require removal of any installed reactor hardware, such as jet pump assembly hardware or shroud repair hardware.

In an embodiment, the vibration mitigation clamp apparatus may include a first plate, a second plate and a wedge assembly. The vibration mitigation clamp apparatus is attached to upper and lower riser brace leaves of the riser brace assembly, at a location near a weld that attaches the leaves to a riser brace block of the riser brace assembly that is affixed to an RPV sidewall. The wedge assembly is expandable to apply forces on inside surfaces of the riser brace leaves, countering clamping forces applied to the first and second plate to fixedly secure the vibration mitigation clamp apparatus on the riser brace assembly.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

A vibration mitigation clamp apparatus in accordance with the invention is designed to stiffen an entire riser brace assembly, thereby increasing the natural vibration frequency of the riser brace assembly. For example, when a vibrating string is shortened (e.g., the string is stiffened to shorted the portion of the string that is subject to vibration, the natural vibration frequency of the string increases. This same concept is applicable to the present invention, whereby a vibration mitigation clamp apparatus is installed on a riser brace assembly to stiffen the riser brace assembly and hence shorten the portion of the riser brace assembly that is subject to vibration, thereby increasing the natural vibration frequency of the riser brace assembly above a vane passing frequency of reactor recirculation pumps in the reactor pressure vessel, so as to mitigate the effects of flow-induced vibration due to the reactor recirculation pumps on the jet pump assembly 34, for example.

Figure 3:
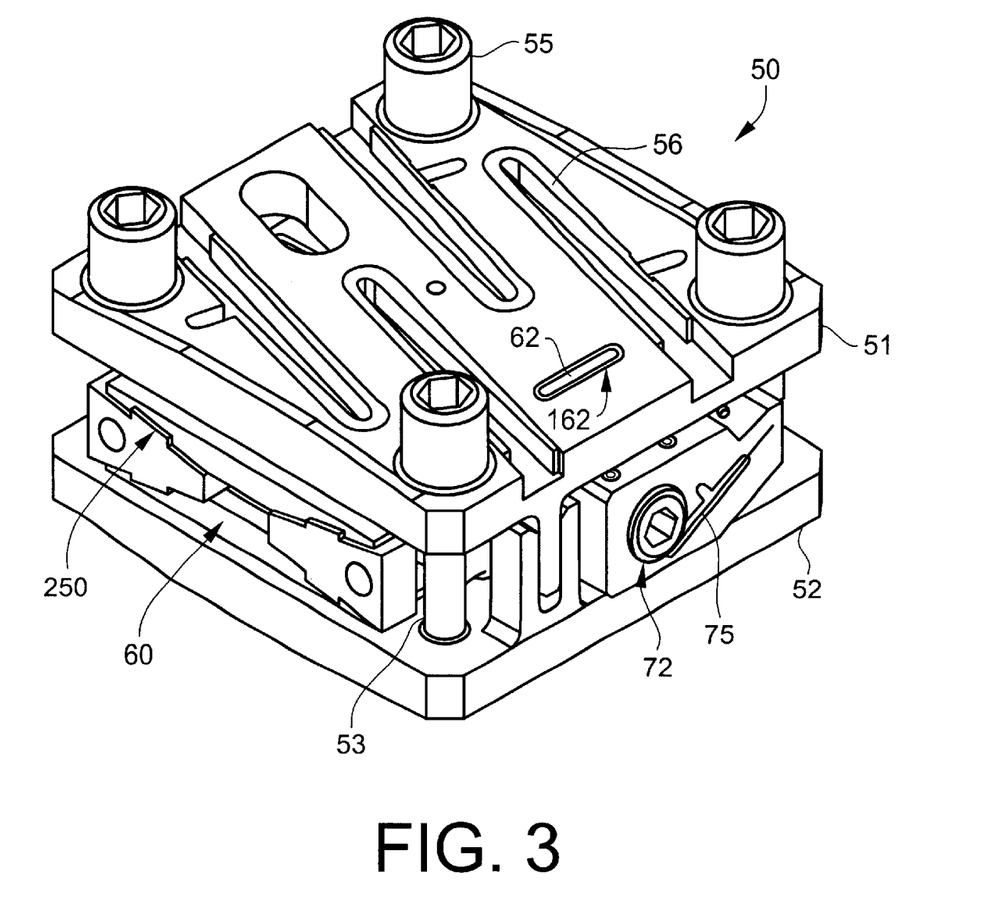
FIG. 3 is an isometric view of a vibration mitigation clamp apparatus in accordance with an exemplary embodiment of the invention.

FIG. 3 is an isometric view of a vibration mitigation clamp apparatus (hereinafter clamp apparatus 50) in accordance with an exemplary embodiment of the invention. The clamp apparatus 50 provides structural support to a riser brace assembly 40 in an RPV 20. Clamp apparatus 50 includes a top plate 51 and a support plate 52. Top plate 51 and support plate 52 sandwich a wedge assembly 60. As will be illustrated further, clamp apparatus 50 is configured to be positioned near an interface between RPV sidewall 30 and riser brace assembly 40. Top plate 51 and support plate 52 are fixedly connected around wedge assembly 60 by a plurality of clamp bolts 53 and clamp bolt nuts 55.

As will be explained in further detail below, top plate 51 includes retaining elements including clamp bolt nut ratchet springs 56 that permit the rotation of clamp bolt nuts 55 in only one direction. Wedge assembly 60 may be comprised of several portions or components that are fixedly secured together via a wedge bolt 72 and nut plate 81. Wedge assembly 60 also includes a latch 75 for securing wedge bolt 72 in place. Further, top plate 51 includes a slot 162 that receives a key 62 from one of the wedge components of wedge assembly 60.

Figure 4:
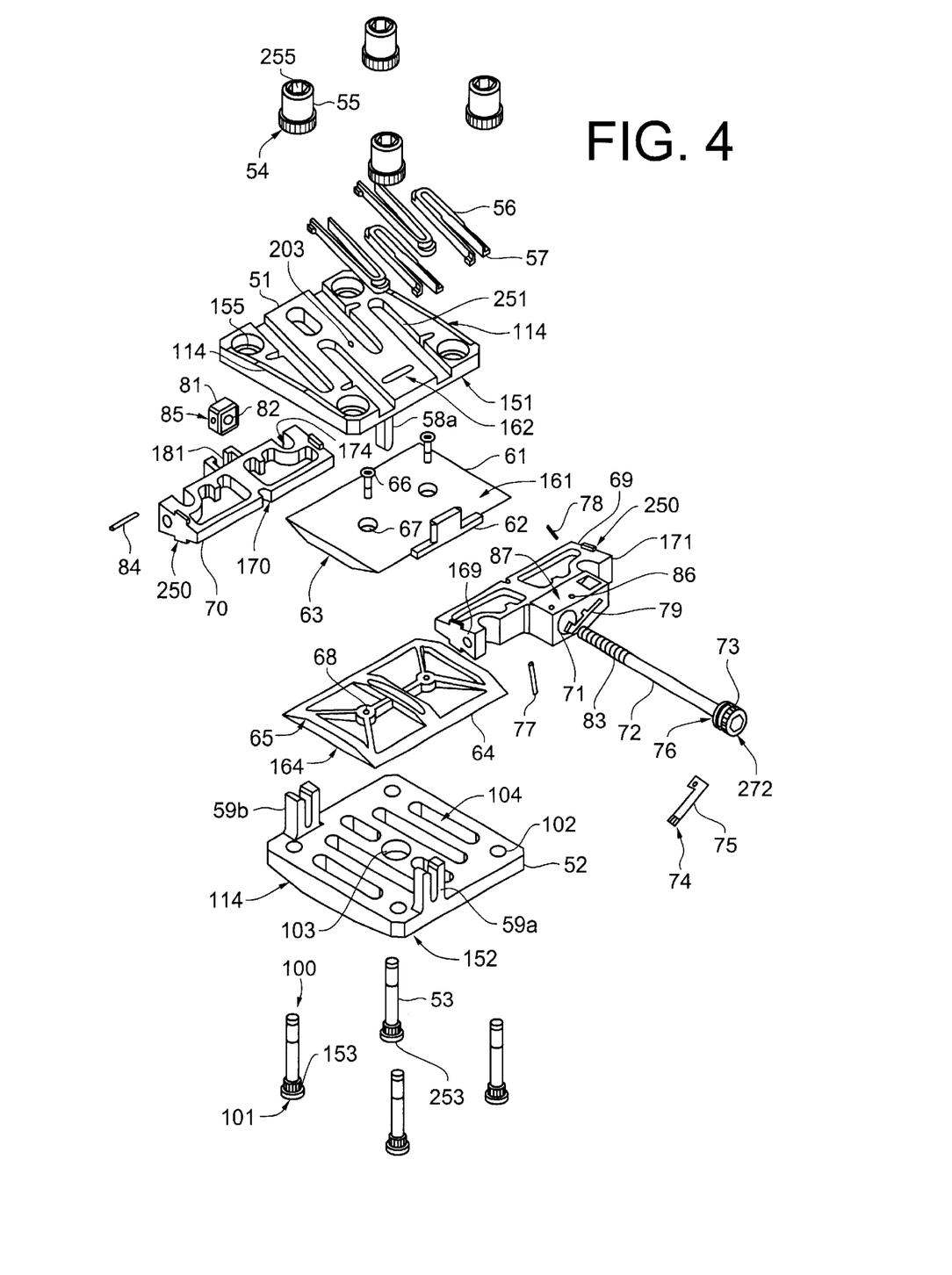
FIG. 4 is a exploded prospective view of the clamp apparatus shown in FIG. 3, in accordance with an exemplary embodiment of the present invention.

FIG. 4 is an exploded perspective view of the clamp apparatus 50 shown in FIG. 3. Primary components of the clamp apparatus 50 include a top plate 51, a support plate 52, a wedge assembly 60, and associated mechanical fasteners and retaining devices, to be explained in detail hereinafter.

The top plate 51 includes necessary slots, holes, and under-cuts to contain clamp bolt nut ratchet springs 56 and to minimize weight of top plate 51 in relation to the weight supported by riser brace assembly 40. For example, slots 251 are provided to receive clamp bolt nut ratchet springs 56 and as a secondary benefit reduce mass of top plate 51; and counter bores 155 to receive clamp bolt nuts 55. Tongues 58a and 58b (58b not shown in FIG. 3) are incorporated in top plate 51 and protrude from a bottom surface 151 of the top plate 51. Tongues 58a and 58b mate with "blind" grooves 59a and 59b of the support plate 52. In addition, a slot 162 is provided to mate with a key 62 of a keyed wedge 61 of the wedge assembly 60, so as to ensure alignment of wedge assembly 60 to top plate 51 and support plate 52. It should be understood that the tongue and groove portions could be reversed (e.g., tongues 58a/b could be provided on support plate 52 with grooves 59a/b being provided on top plate 51). Further, top plate 51 includes a tapped through hole 203 to receive special tooling for installing the clamp apparatus 50 in RPV 20.

The clamp bolt nuts 55 include a plurality of equally spaced ratchet teeth 54 that are machined into the outer circumference of clamp bolt nuts 55. The clamp bolt nuts 55 are preferably threaded with an internal ½-20UNF tap (not shown), although other tap dimensions are within the purview of this invention. Additionally, ample bolt head-room and an internal hexagon interior shape 255 are provided, thus enabling the clamp bolt nuts 55 to be rotated as desired.

Clamp bolt nut ratchet springs 56 include ratchet teeth or latches 57 that interface with clamp bolt nut ratchet teeth 54 of the clamp bolt nut 55. As clamp bolt nuts 55 are rotated in the direction to increase bolt preload, the springs and latches behave like cantilever beams in deflecting the necessary distance to allow rotation of clamp bolt nuts 55. The ratchet teeth 54 and 57 are oriented such that rotation in the desired direction is only permitted. The clamp bolt nuts 55 can be removed only after the springs 56 and associated ratchet teeth 57 have been "cammed back" to provide clearance for the subject teeth 54.

The clamp bolts 53 preferably contain external ½-20UNF threads at the distal end 100 and 9/16-20UN left-handed threads at a proximal end (bolt head end) 101. Each clamp bolt 53 has a flange 153 that is provided at the proximal end 101 which seats in a counter-bore recess (not shown, but see arrow 152) of the support plate 52 upon assembly. The clamp bolts 53 are seated tight in the support plate 52, preferably by using a ¼ inch internal hexagon socket 253 that is machined in the proximal end 101 of each clamp bolt 53.

Accordingly, advantageous features of the support plate 52 include four counter-bored threaded openings 102 designed to receive the four clamp bolts 53, blind groove 59a and 59b to receive corresponding tongues 58a and 58b of the top plate 51, a counter-bored slot opening 103 for connection to installation tooling, and slots 104 provided therein that are designed to reduce mass or weight of the support plate 52. The counter-bored threaded openings 102 are preferably designed with 9/16-20UN left-handed threads to receive the proximal ends 101 of the clamp bolts 53. This thread selection ensures that the clamp bolts 53 do not loosen under the action of torquing the clamp bolt nuts 55 to the clamp bolts 53. In addition, the diameter of the threaded openings 102 is large enough to allow passage of the distal end 100 of a clamp bolt 53 during assembly.

As mentioned, the blind grooves 59a and 59b of support plate 52 mate with tongue portions 58a and 58b of the top plate 51. This interface ensures alignment of the support plate 52 and top plate 51 in both the radial and tangential directions, thus ensuring proper clamp bolt 53 positioning. This bolt positioning ensures that the clamp bolt nuts 55 are properly centered in the top plate 51 counter-bores 155, which facilitates proper engagement of ratchet teeth 54 on the clamp bolt nuts 55 with ratchet teeth 57 on the clamp bolt nut ratchet springs 56. The top plate 51 includes webs 114 that increase thickness at the center of top plate 51. Similar to the top plate 51, the support plate 52 incorporates webs 114 at both edges of the support plate 52. These webs 114 act in unison to increase the section modulus of the top plate 51 and support plate 52 against bending.

The wedge assembly 60 consists of four wedge components: a keyed wedge 61, a stationary wedge 64, a movable wedge 69 and a coupled wedge 70, and associated mechanical fasteners and retaining devices. The first of these wedge components is a keyed wedge 61. A flat surface 161 of the keyed wedge 61 mates with an underside surface of upper riser brace leaf 41. Additionally, the keyed wedge 61 includes a key 62 which aids in positioning the wedge assembly 60 relative to the upper riser brace leaf 41. This key 62 also interfaces with the top plate 51, so that wedge assembly 60 is properly positioned in relation to the other components of the clamp apparatus 50. Opposing inclined surfaces 63 of the keyed wedge 61 form a dihedral angle of 160 degrees.

The stationary wedge 64 is essentially identical to the keyed wedge 61, except that there is no key 62. A flat surface 164 of the stationary wedge 64 mates with an upper side surface of the lower riser brace leaf 42. As with the keyed wedge 61, opposing inclined surfaces 65 of the stationary wedge 64 form a dihedral angle of 160 degrees.

Shoulder screws 66 are provided to maintain the keyed wedge 61 and the stationary wedge 64 in alignment with one another. Counter-bored clearance holes 67 in the keyed wedge 61 allow for the passage of the shoulder screws 66. The depth of the counter-bores in clearance holes 67 accommodates the range of motion between the keyed wedge 61 and stationary wedge 64 components. The shoulder screws 66 are stationary with the stationary wedge 64 by virtue of being threaded into tapped holes 68 in the stationary wedge. The opposing inclined surfaces 63 and 65 of the keyed wedge 61 and stationary wedge 64 form an included angle of 20 degrees.

The remaining wedge components of wedge assembly 60 include the movable wedge 69 and the coupled wedge 70. Common features to both of these wedge components include a circular through hole (shown at 170 in coupled wedge 70) which receives a wedge bolt 72. Movable wedge 69 and the coupled wedge 70 also each have inclined surfaces (169 and 172) which form a 20 degree included angle, and cut-outs (at 171 and 174) which provide clearance for the four clamp bolts 53. The movable wedge 69 and coupled wedge 70 oppose each other with their inclined surfaces 169 and 172 mating with the inclined surfaces 63 and 65 of the keyed wedge 61 and stationary wedge 64.

The four wedge components 61, 64, 69 and 70 have a natural tendency to stay in alignment when the inclined surfaces 63, 65, 169 and 172 are properly mated, with exception of a direction perpendicular to the axis of the wedge bolt 72. In order to maintain the desired alignment in this direction, "ledge" features are incorporated in the design of the movable wedge 69 and coupled wedge 70. Specifically referring to FIGS. 3 and 4, protrusions 250 are formed at edges of the movable wedge 69 and coupled wedge 70 to ensure that all four wedges are in alignment in the direction perpendicular to the axis of the wedge bolt 72, when wedge assembly 60 is assembled.

The movable wedge 69 includes a circular counter-bored recess 71 and a circular through hole 170 to receive the wedge bolt head 272 of wedge bolt 72. The design of the wedge bolt 72 incorporates thirty-six equally spaced ratchet teeth 73 which are machined into the periphery of the bolt head 272. These ratchet teeth 73 engage teeth 74 of a latch 75, thereby preventing the wedge bolt 72 from becoming loose in a flow-induced vibration environment that is indigenous to the riser brace assembly 40.

Additionally, a circular groove 76 is provided in the head 272 of the wedge bolt 72. The purpose of this circular groove 76 is to maintain the wedge bolt 72 captive with the movable wedge 69. This is accomplished by installing a dowel pin 77 into a drilled passageway (not shown) whose axis is perpendicular to the axis of rotation of the wedge bolt 72. The dowel pin 77 is held captive by virtue of an interference fit between dowel pin 77 and the drilled passageway, the diameter of which is slightly smaller than the diameter of the dowel pin 77. After the dowel pin is inserted, the opening of the drilled passageway is slightly swaged in order to secure dowel pin 77 within the drilled passageway. The drilled passageway in the movable wedge 69 is precisely located to be in line with the circular groove 76 of the wedge bolt 72, thus allowing rotational movement and preventing translational movement of the wedge bolt 72.

The latch 75 resides in a machined recess 79 of the movable wedge 69 and is similarly held captive by installing an appropriate dowel pin 78. The ratchet teeth 74 of the latch 75 interact with the ratchet teeth 73 of the wedge bolt 72 such that as the wedge bolt 72 is rotated, the latch 75 deflects like a cantilever beam sufficient to allow passage of the wedge bolt ratchet teeth 73. Angles machined into the respective ratchet teeth 73 and 74 are such as to only allow rotation of the wedge bolt 72 in a direction which results in shortening the distance between the movable wedge 69 and coupled wedge 70. This motion acting through the inclined surfaces 63, 65, 169 and 172 of all of the wedge components results in the keyed and stationary wedges 61 and 64 separating from one another, with their flat surfaces 161 and 164 being maintained parallel to one another.

The coupled wedge 70 includes a nut plate 81 that is mounted so as to bear on a flat surface 181 that is perpendicular to the circular through hole 170 that received wedge bolt 72. The nut plate 81 incorporates a tapped through hole 82 to receive the threaded end 83 of the wedge bolt 72. The nut plate 81 is allowed to float but is prevented from rotating, thus acting in conjunction with the wedge bolt 72 to control a relative distance between the movable wedge 69 and coupled wedge 70. Specifically, nut plate 81 is held captive to the coupled wedge 70 by virtue of a dowel pin 84 pressed into the coupled wedge 70. The dowel pin 84 passes through an oversized through hole 85 in the nut plate 81, thus enabling the nut plate 81 to float, but not to bind with rotation of the wedge bolt 72. Dowel pin 84 is similar to dowel pin 77 in that it is held captive by an interference fit in a drilled passageway 85.

Accordingly, wedge components 61, 64, 69 and 70, and their associated fasteners, are designed with the intent of minimizing overall mass of the clamp apparatus 50. In addition, two small blind holes 86 located in a top surface 87 of the movable wedge 69 are provided for tooling purposes. The repair is completed after all of the mechanical fasteners are properly preloaded and ratchet springs and latches are verified as being properly engaged.

Figure 5:
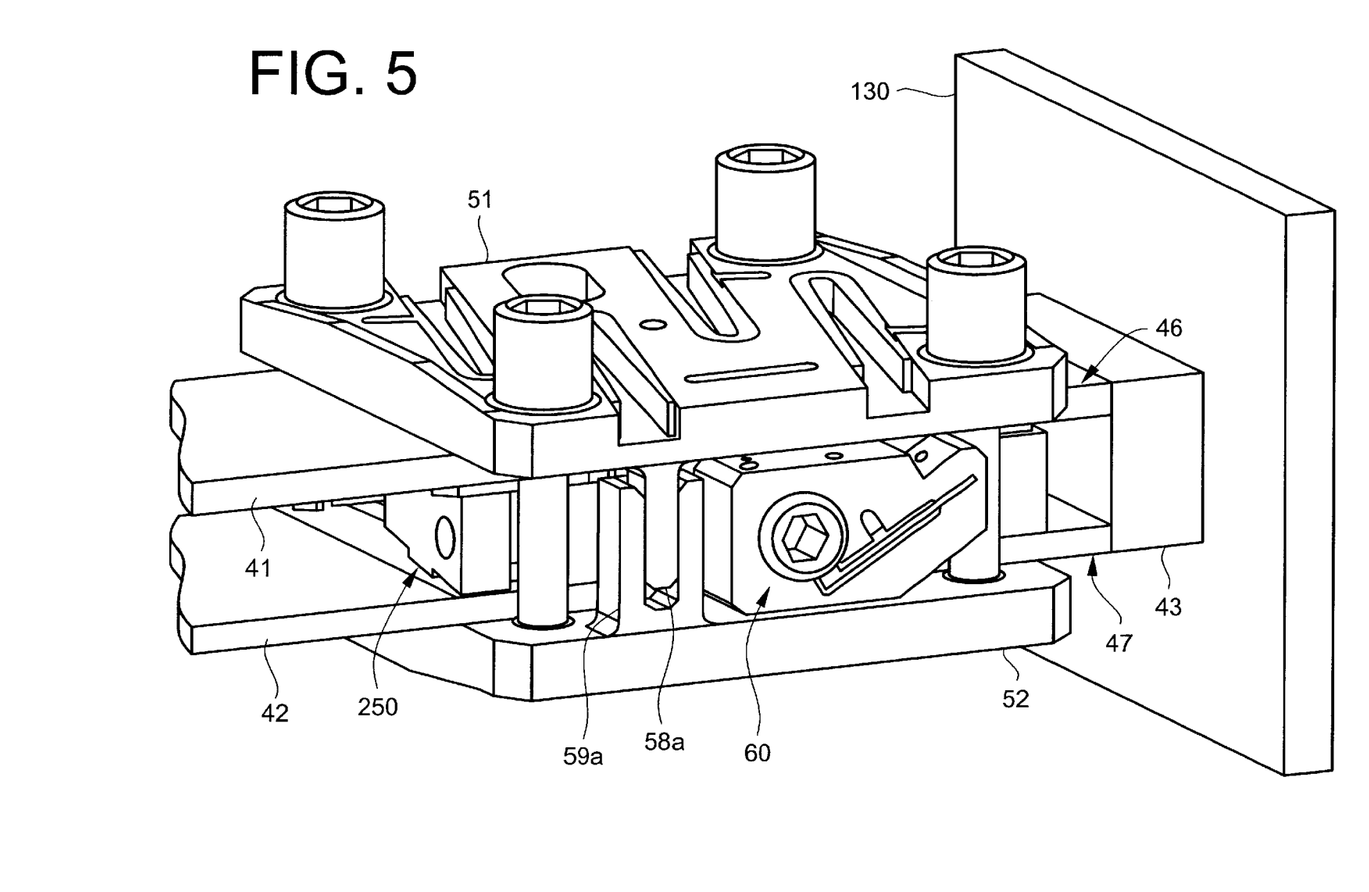
FIG. 5 illustrates the connection of the clamp apparatus within a reactor pressure vessel (RPV) in accordance with an exemplary embodiment of the present invention.

FIG. 5 illustrates the connection of the clamp apparatus 50 within a reactor pressure vessel (RPV) 20 in accordance with an exemplary embodiment of the present invention. FIG. 5 illustrates how the various components of clamp apparatus 50 interface with RPV 20 and the riser brace leaves 41 and 42. Clamp apparatus 50 is installed so that the top plate 51 bears against an upper surface 46 of the upper riser brace leaf 41, and so that support plate 52 bears against a lower surface 47 of the lower riser brace leaf 42, thereby sandwiching wedge assembly 60 between leaves 41 and 42. Accordingly, the riser brace leaves 41 and 42 are sandwiched between the top plate 51, support plate 52, and wedge assembly 60. Clamp apparatus 50 is positioned so as to shorten a portion or segment of the riser brace assembly 40 (e.g., a portion of the riser brace leaves 41 and 42) that is subject to vibration, Clamp assembly is arranged in spaced relation to RPV sidewall 30, as illustrated in FIG. 5.

The clamp apparatus 50 is designed to stiffen the entire riser brace assembly 40, thereby increasing the natural vibration frequency of the riser brace assembly 40. The vibration mitigation clamp apparatus of the present invention is somewhat similar to the riser brace repair clamp apparatus described in co-pending and commonly assigned U.S. application Ser. No. 10/224,430, filed Aug. 21, 22, by the inventor, entitled METHOD AND APPARATUS FOR REPAIRING JET PUMP RISER BRACE IN NUCLEAR REACTOR. Differences are exhibited in the design of the top plate 51 and support plate 52. The vibration mitigation clamp apparatus 50 does not interface directly with RPV sidewall 30, as does the riser brace repair clamp apparatus of the commonly-assigned application, which secures to the RPV sidewall 30 to riser brace block 43. As such, there are no tongues associated with the top plate 51 and support plate 52 that engage machined grooves in riser brace block 43, although there is a tongue and groove relationship which interlocks top plate 51 and support plate 52 together, as indicated above. There also are no block bolts, block bolt nuts, and associated latch springs, as described in the commonly-assigned application.

In the embodiment of FIG. 5, for example, clamp apparatus 50 is installed on the riser brace assembly 40 approximately three-fourths of an inch away from the riser brace block 43, and is maintained in this location by friction force of the plates 51 and 52 and wedge assembly 60 in mating engagement with leaves 41 and 42. However, the present invention is not limited to this spatial dimension, as the clamp apparatus 50 may be arranged so as to be closer to, or farther away from, riser brace block 43.

The wedge assembly 60 is adjustable, and is installed between the riser brace leaves 41 and 42, thus filling the space between the leaves 41 and 42. The top plate 51 and support plate 52 are installed above the upper riser brace leaf 41 and below the lower riser brace leaf 42, respectively. Mechanical fasteners are provided at corners of the clamp apparatus 50 to provide mechanical preload (e.g., clamp bolts 53, clamp bolt nuts 55, etc.), wedge bolt 72 and nut plate 81 additionally provides preload in wedge assembly 60. Tongue and groove interfaces (e.g. interface between tongue 58a and groove 59a, for example) between top plate 51 and support plate 52 provide alignment for top plate 51 and support plate 52 in both tangential and radial directions, and are able to slide in the axial direction relative to the axis of RPV 20. If the key 62 in keyed wedge 61 were to be omitted, there would be no mechanism to precisely locate the wedge assembly 60 so that it properly engages leaves 41 and 42.

Figure 6:
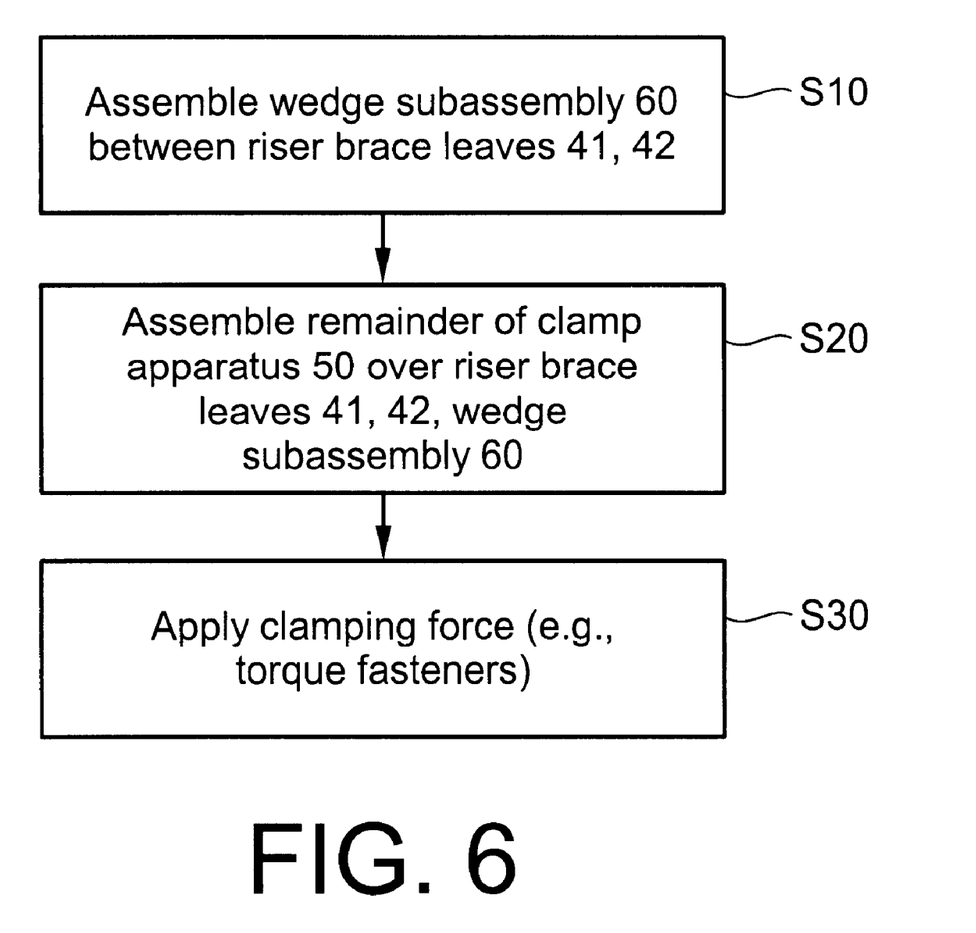
FIG. 6 is a flowchart illustrating an exemplary method of supporting a riser brace assembly in accordance with the invention.

The clamp apparatus 50 having been described, a method of stiffening riser brace assembly 40 and/or installing clamp apparatus 50 on riser brace assembly 40 is now described. FIG. 6 is a flowchart illustrating an exemplary method in accordance with the invention. In general, after reactor safety procedures for maintenance/repair personnel have been complied with, and an overall inspection of the installation locations has been videotaped, looking for anything unexpected relating to the as-built configuration of the riser brace assemblies, the clamp apparatus 50, which is transported by special tooling connected to clamp apparatus at several locations (hole 103 in support plate 52, tapped holes 86 in the movable wedge 69, and tapped through hole 203 in top plate 51) to a submerged location in the reactor, is installed. Prior to the installation, if there are any obstructions on the riser brace assembly, such as near the interface between riser brace leaves 41, 42 and riser brace block 43, or riser brace block 43 and pad 130, the obstruction may be removed by electric discharge machining (EDM) and/or grinding with an abrasive material, as is known.

The wedge assembly 60 is assembled and installed (Step S10). As maneuvering within the reactor pressure vessel is difficult, since the clamp apparatus 50 is to be installed remotely at a riser brace assembly 40 that is often in excess of 60 feet away from an access cover and submerged, as much pre-assembly of components is performed as is practical. In general, the keyed wedge 61, stationary wedge 64, movable wedge 69 and coupled wedge 70 are pre-assembled, with shoulder screws 66, latch 75, nut plate 81, wedge bolt 72 and dowel pins 77, 78 and 84 already inserted and secured in their respective wedge components. For example, thread lubricant is applied onto (1) bearing surfaces of the wedge bolt 72 and movable wedge 69, (2) threads of the wedge bolt 72 and nut plate 81, (3) bearing surfaces of the nut plate 81 and coupled wedge 70, and (4) inclined surfaces 63, 35, 169, 172 of the movable wedge 69, coupled wedge 70, keyed wedge 61, and stationary wedge 64. Space between the upper and lower riser brace leaves 41 and 42 is verified to be free of any foreign material (the leaf surfaces should be smooth and flat). A distance of the space between the upper and lower riser brace leaves 41 and 42 is ascertained and wedge assembly 60 thickness is set to a predetermined thickness in order to facilitate installation between the riser brace leaves 41 and 42. The entire wedge assembly 60 is then installed between the riser brace leaves 41 and 42, with the keyed wedge 61 arranged in the desired location bearing against the upper riser brace leaf 41.

The remaining components of clamp apparatus 50 are assembled (Step S20), e.g., the support plate 52 with clamp bolts 53 already in place attached are inserted from underneath wedge assembly 60 (see FIG. 5), and top plate 51, with clamp bolt nut ratchet springs 56 already secured in place, is positioned above and over the clamp bolts 53. As with the wedge assembly 60, these components are therefore pre-assembled outside RPV 20 (e.g., field assembled) in order to limit the complexity of installation within RPV 20

The top plate 51 and clamp bolt nuts 55 are positioned over upper surface 46 of riser brace block 43, and the key 62 of the keyed wedge 61 is engaged in slot 162 of the top plate 51. The top plate 51 should be in contact with an upper surface of the upper riser brace leaf 41, with all four clamp bolts 53 protruding through counter-bored openings 155 of the top plate 51.

Clamping forces are then applied (Step S30) to fixedly secure the clamp apparatus 50 to the riser brace assembly 40. The four clamp bolt nuts 55 are installed and initially tightened to a desired torque (e.g., to 2+/−1 lb-ft, for example). The clamp bolt nuts 55 are then gradually torqued (in 5 lb-ft increments up to 30 lbs-ft, for example) in an alternating fashion to maintain even pressure on the clamp apparatus 50. As shown in FIG. 5, an underside surface of top plate 51 should be in contact with a top surface of upper riser brace leaf 41; and the support plate 52 should be in contact with the lower riser brace leaf 42, with the clamp bolts 53 straddling the wedge assembly 60.

The wedge bolt 72 is initially torqued (e.g., to 10+/−2.5 lb-ft, for example) in order to increase the wedge assembly 60 thickness to bring wedge surfaces into contact with the upper and lower riser brace leaves 41 and 42. assembly 50. The torquing process to the wedge bolt 72 is repeated until the teeth 74 of the latch spring 75 are fully engaged with the teeth 73 of the wedge bolt 72. If necessary, the torque of wedge bolt 72 is increased to bring the subject latch teeth 74 into full engagement. Similarly, the teeth 57 of clamp bolt nut latch springs 56 are verified to be fully engaged with the teeth 54 of clamp bolt nuts 55. If necessary, torque to clamp bolt nuts 55 is increased to bring the subject latch teeth 54 into full engagement.

The installed clamp apparatus 50 stiffens the entire riser brace assembly 40, thereby increasing the natural vibration frequency of the riser brace assembly 40 above the vane passing frequency of a recirculation pump in RPV 20. As can be seen above, installation of the clamp apparatus 50 does not require removal of any installed reactor hardware, such as jet pump assembly hardware or shroud repair hardware.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A clamp apparatus stiffening a riser brace assembly fixedly attached between a riser pipe in a nuclear reactor and a wall of the reactor for stabilizing the riser pipe, the riser brace assembly composed of a riser brace block attached to the wall, an upper riser brace leaf and a lower riser brace leaf, the upper and lower riser brace leaves in spaced vertical relation from each other and attached between the riser brace block and to the riser pipe via a riser brace, the clamp apparatus comprising:

a first plate engaging a top surface of the upper riser brace leaf;

a second plate engaging a bottom surface of the lower riser brace leaf; and a wedge assembly arranged between the first and second plates and engaging a bottom surface of the upper riser brace leaf and a top surface of the lower riser brace leaf.

2. The clamp apparatus of claim 1, wherein
   the first plate and second plate apply clamping forces on the riser brace leaves, and
   the wedge assembly applies counter-forces to the clamping forces on opposing surfaces of the riser brace leaves so as to fixedly secure the clamp apparatus to the riser brace assembly.

3. The clamp apparatus of claim 2, wherein the wedge assembly is expandable so as to apply forces countering the clamping forces.

4. The clamp apparatus of claim 2, further comprising a plurality of mechanical fasteners adapted to provide clamping forces to the first plate, second plate and wedge assembly.

5. The clamp apparatus of claim 1, wherein the wedge assembly further includes a plurality of wedge components, said wedge components adapted to evenly distribute stress on the riser brace assembly.

6. The clamp apparatus of claim 5, wherein one of the wedge components includes a key that engages a slot in the first or second plate, aligning the wedge assembly between the first and second plates.

7. clamp apparatus of claim 1, wherein the first and second plates engage each other via a tongue and groove interface.

8. The clamp apparatus of claim 1, wherein;
   the first plate includes one or more tongue portions, and
   the second plate includes one or more protrusions containing a recessed groove engaging a tongue portion of the first plate, aligning the first and second plates at the riser brace assembly.

9. The clamp apparatus of claim 1, wherein the first plate, second plate and wedge assembly are positioned near an interface attaching the riser brace block to the riser brace leaves.

10. A clamp apparatus supporting a riser brace assembly fixedly attached between a riser pipe in a nuclear reactor and a wall of the reactor for stabilizing the riser pipe, the riser brace assembly having a riser brace block attached to the wall, an upper riser brace leaf and a lower riser brace leaf, the upper and lower riser brace leaves in spaced vertical relation from each other and attached between the riser brace block and to the riser pipe via a riser brace, the clamp apparatus comprising:

a top plate in contact with a surface of the upper riser brace leaf;

a support plate in contact with a surface of the lower riser brace leaf; and a wedge assembly provided between the top plate and support plate applying tension against surfaces of the upper and lower riser brace leaves that are opposite the surfaces in contact with the top plate and support plate.

11. The clamp apparatus of claim 10, further comprising a plurality of fasteners applying clamping forces to fixedly secure the top plate and support plate to the riser brace leaves.

12. The clamp apparatus of claim 10, wherein the top plate and support plate engage each other via a tongue and groove interface.

13. The clamp apparatus of claim 12, wherein
   the top plate includes one or more tongue portions, and
   the support plate includes one or more protrusions containing a recessed groove for engaging a tongue portion of the support plate aligning the top plate and support plate at the riser brace assembly.

14. The clamp apparatus of claim 1, wherein
   the upper riser brace leaf is sandwiched between a wedge assembly top surface and a first plate bottom surface, and
   the lower riser brace leaf is sandwiched between a wedge assembly bottom surface and a second plate top surface.

15. The clamp apparatus of claim 10, wherein
   the upper riser brace leaf is sandwiched between a wedge assembly top surface and a top plate bottom surface, and
   the lower riser brace leaf is sandwiched between a wedge assembly bottom surface and a support plate top surface.

* * * * *